United States Patent
Chen et al.

(10) Patent No.: US 12,378,415 B2
(45) Date of Patent: Aug. 5, 2025

(54) HIGH OXYGEN PERMEABILITY SILICONE HYDROGEL COMPOSITION, CONTACT LENS MADE FROM HIGH OXYGEN PERMEABILITY SILICONE HYDROGEL COMPOSITION AND MANUFACTURING METHOD THEREOF

(71) Applicant: INNOVA VISION INC., Hsinchu (TW)

(72) Inventors: Yo-Lun Chen, Hsinchu (TW);
Shih-Che Huang, Hsinchu (TW);
Hsiu-Wei Ou, Hsinchu (TW)

(73) Assignee: INNOVA VISION INC., Hsinchu (TW)

(*) Notice: Subject to any disclaimer, the term of this patent is extended or adjusted under 35 U.S.C. 154(b) by 677 days.

(21) Appl. No.: 17/733,731

(22) Filed: Apr. 29, 2022

(65) Prior Publication Data
US 2023/0348719 A1   Nov. 2, 2023

(51) Int. Cl.
| | |
|---|---|
| C08L 83/04 | (2006.01) |
| C08G 77/14 | (2006.01) |
| C08G 77/20 | (2006.01) |
| C08L 83/10 | (2006.01) |
| C08L 83/12 | (2006.01) |

(52) U.S. Cl.
CPC .............. C08L 83/04 (2013.01); C08G 77/14 (2013.01); C08G 77/20 (2013.01); C08L 83/10 (2013.01); C08L 83/12 (2013.01)

(58) Field of Classification Search
CPC ......... C08G 77/14; C08G 77/20; C08L 83/10; C08L 83/12
See application file for complete search history.

(56) References Cited

U.S. PATENT DOCUMENTS

| | | | | |
|---|---|---|---|---|
| 2009/0299022 A1* | 12/2009 | Ichinohe | ............... | C07F 7/0838 526/279 |
| 2012/0220688 A1* | 8/2012 | Wang | ..................... | G02B 1/043 351/159.33 |
| 2019/0310404 A1* | 10/2019 | Klun | ....................... | G02B 5/208 |
| 2020/0241361 A1* | 7/2020 | Mukaigaito | ........... | C08L 101/00 |

* cited by examiner

Primary Examiner — Kregg T Brooks
Assistant Examiner — David R. Foss
(74) Attorney, Agent, or Firm — Ying-Ting Chen; Law Office of Michael Chen

(57) ABSTRACT

A high oxygen permeability silicone hydrogel composition, contact lens made from the high oxygen permeability silicone hydrogel composition and manufacturing method of the contact lens are disclosed. The high oxygen permeability silicone hydrogel composition includes a first silicone polymer, a second silicone polymer, at least one hydrophilic monomer, a crosslinking agent, an initiator, and a solvent. By adjusting the ratio of each silicone polymer molecule and the hydrophilic monomer in the contact lens, the present invention can not only provide the contact lens with high oxygen permeability, but also expand the design scope of the silicone hydrogel contact lens.

8 Claims, 2 Drawing Sheets

--- evenly mixing the high oxygen permeability silicone hydrogel composition and pouring the composition in a mold (S01)

↓ continuously heating the high oxygen permeability silicone hydrogel composition to cure according to following stages to form a semifinished product:
a first stage: heated at 40±2°C for 30 minutes;
a second stage: heated at 60±2°C for 30 minutes; and
a third stage: heated at 80±2°C for 30 minutes (S02)

↓ washing the semifinished product by an aqueous alcohol solution to extract non-cured portion from the semifinished product and then form a contact lens (S03)

evenly mixing the high oxygen permeability silicone hydrogel composition and pouring the composition in a mold (S01)

↓ continuously heating the high oxygen permeability silicone hydrogel composition to cure according to following stages to form a semifinished product:
a first stage: heated at 40±2°C for 30 minutes;
a second stage: heated at 60±2°C for 30 minutes; and
a third stage: heated at 80±2°C for 30 minutes (S02)

↓ washing the semifinished product by an aqueous alcohol solution to extract non-cured portion from the semifinished product and then form a contact lens (S03)

Fig. 1

HIGH OXYGEN PERMEABILITY SILICONE HYDROGEL COMPOSITION, CONTACT LENS MADE FROM HIGH OXYGEN PERMEABILITY SILICONE HYDROGEL COMPOSITION AND MANUFACTURING METHOD THEREOF

FIELD OF THE INVENTION

The present invention relates to a high oxygen permeability silicone hydrogel composition and a contact lens made from the high oxygen permeability silicone hydrogel composition. More particularly, the present invention relates to a high oxygen permeability silicone hydrogel composition made by free radical polymerization, a contact lens made using the high oxygen permeability silicone hydrogel composition as an ingredient and a manufacturing method of the contact lens.

BACKGROUND OF THE INVENTION

Silicone hydrogel is an organic polymer material. On the application of contact lens, research and development direction of the silicone hydrogel is to provide contact lens oxygen transmission without relying on water molecules. However, the silicon molecule in the silicone hydrogel has extremely high hydrophobic properties. In addition to the phase separation with the hydrophilic monomer, the silicon molecule also causes the surface of the silicone hydrogel contact lens to exhibit hydrophobic properties, which makes the oxygen permeability of the contact lens ineffective and causes eye discomfort. Therefore, how to synthesize a hydrophilic monomer with high oxygen permeability and improved compatibility, as well as a silicone hydrogel composition suitable for making contact lens, has always been the focus of research and development of various contact lens manufacturers. The technology of the present invention is to provide a novel high oxygen permeability silicone hydrogel composition, and a contact lens using the high oxygen permeability silicone hydrogel composition. The contact lens can have high oxygen permeability by adjusting the ratio of the silicon molecule and the hydrophilic monomer in the composition, which improves the applicability of the contact lens.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A high oxygen permeability silicone hydrogel composition is disclosed. It comprises: a first silicone polymer, in an amount from 5% to 20% by weight of the composition, having a structural formula (I) below:

wherein m is an integer between 1 and 20 and n is an integer between 40 and 80; a second silicone polymer, in an amount from 30% to 60% by weight of the composition, having a structural formula (II) below:

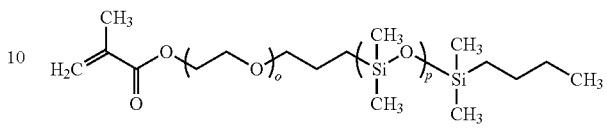

(II)

wherein o is an integer between 1 and 10 and p is an integer between 5 and 15; at least one hydrophilic monomer, in an amount from 20% to 50% by weight of the composition; a crosslinking agent, in an amount from 0.1% to 2% by weight of the composition; an initiator, in an amount from 0.5% to 2% by weight of the composition; and a solvent, in an amount from 5% to 20% by weight of the composition.

According to the present invention, the hydrophilic monomer is selected from the group consisting of 2-hydroxyethyl methacrylate, glycerol methacrylate, acrylic acid, methacrylic acid, N,N-dimethylacrylamide, N-vinylpyrrolidone, N-vinyl-N-methyl acetamide, 2-methacryloyloxyethyl phosphorylcholine and mixtures or derivatives thereof.

According to the present invention, the crosslinking agent is selected from the group consisting of ethylene glycol di(meth)acrylate, triethylene glycol di(meth)acrylate, tri(ethylene glycol) divinyl ether, tetramethylene glycol di(meth)acrylate and triallyl isocyanurate.

According to the present invention, the solvent is selected from the group consisting of n-butanol, t-butanol, n-pentyl alcohol, t-amyl alcohol, n-hexanol, n-octanol, n-nonanol and n-decanol.

The initiator may be a photoinitiator and selected from the group consisting of Darocur 1173, Irgacure 184, Irgacure TPO, Irgacure 1700, Irgacure 1800, Irgacure 1850 and Irgacure 819.

The initiator may be a thermal initiator and selected from the group consisting of 2,2'-azobis(2-methylpropionitrile) and 1,1'-azobis(cyanocyclohexane).

A contact lens is also disclosed. The contact lens is made from the high oxygen permeability silicone hydrogel composition mentioned above.

A manufacturing method of contact lens is disclosed. It comprises steps of: a) evenly mixing the high oxygen permeability silicone hydrogel composition according to claim 6 and pouring the composition in a mold; b) continuously heating the high oxygen permeability silicone hydrogel composition to cure according to following stages to form a semifinished product: a first stage: heated at 40±2° C. for 30 minutes; a second stage: heated at 60±2° C. for 30 minutes; and a third stage: heated at 80±2° C. for 30 minutes; and c) washing the semifinished product by an aqueous alcohol solution to extract non-cured portion from the semifinished product and then form a contact lens.

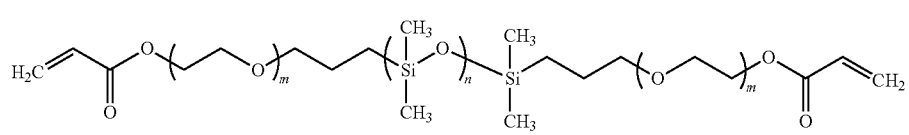

(I)

Another manufacturing method of contact lens is disclosed. It comprises steps of: a) evenly mixing the high oxygen permeability silicone hydrogel composition according to claim 6 and pouring the composition in a transparent mold; b) irradiating the transparent mold with UV light for 15 to 30 minutes under 25±2° C. to cure the high oxygen permeability silicone hydrogel composition to form a semifinished product; and c) washing the semifinished product by an aqueous alcohol solution to extract non-cured portion from the semifinished product and then form a contact lens.

Preferably, the aqueous alcohol solution is aqueous ethanol solution or aqueous isopropyl alcohol solution.

By adjusting the ratio of each silicon polymer molecule and the hydrophilic monomer in the contact lens, the present invention can not only provide the contact lens with high oxygen permeability, but also expand the design scope of the silicone hydrogel contact lens.

BRIEF DESCRIPTION OF THE DRAWINGS

FIG. 1 is a flow chart of a manufacturing method of a contact lens using thermal initiator.

DETAILED DESCRIPTION OF THE PREFERRED EMBODIMENTS

Figure 2:
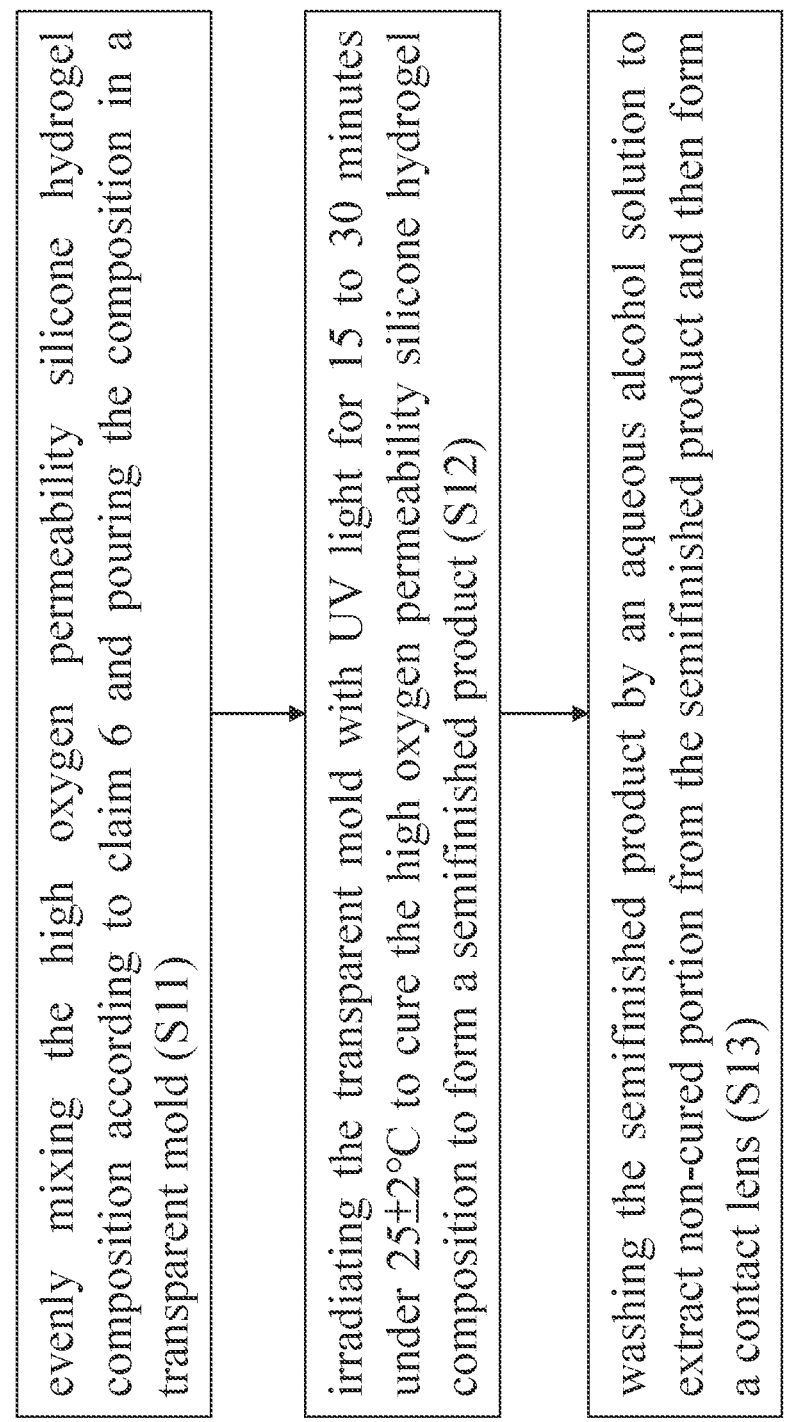
FIG. 2 is a flow chart of a manufacturing method of a contact lens using photoinitiator.

In order to make the description of the disclosure content more detailed and complete, an illustrative description is provided below for the implementation aspects and specific embodiments of the present invention.

A high oxygen permeability silicone hydrogel composition is disclosed. The high oxygen permeability silicone hydrogel composition comprises: a first silicone polymer, a second silicone polymer, at least one hydrophilic monomer, a crosslinking agent, an initiator and a solvent.

The first silicone polymer is in an amount from 5%-20% by weight of the high oxygen permeability silicone hydrogel composition and has a structural formula (I) below.

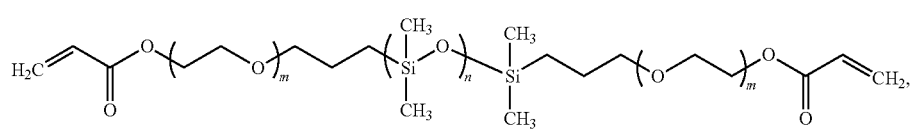

where m is an integer between 1 and 20 and n is an integer between 40 and 80. The average molecular weight of the first silicone polymer molecule is between 5000 and 10000.

The second silicone polymer is in an amount from 30%-60% by weight of the high oxygen permeability silicone hydrogel composition and has the structural formula (II) below:

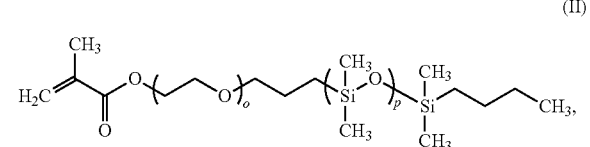

where o is an integer between 1 and 10 and p is an integer between 5 and 15. The average molecular weight of the second silicone polymer molecule is between 1000 and 5000.

The hydrophilic monomer refers to a molecule with a polar group, such as a monohydroxy (OH—), which has a large affinity for water and can attract water molecules or dissolve in water. According to the present invention, the hydrophilic monomer is selected from the group consisting of 2-hydroxyethyl methacrylate (HEMA), glycerol methacrylate (GMA), acrylic acid (AA), methacrylic acid (MAA), N,N-dimethylacrylamide (DMA), N-vinylpyrrolidone (NVP), N-vinyl-N-methyl acetamide (VMA), 2-methacryloyloxyethyl phosphorylcholine (MPC) and mixtures or derivatives thereof. Namely, in the high oxygen permeability silicone hydrogel composition, there are more than one type of hydrophilic monomer, and the content of all hydrophilic monomers is in an amount from 20%-50% by weight of the high oxygen permeability silicone hydrogel composition.

The crosslinking agent performs crosslinking between the first silicone polymer, the second silicone polymer and the hydrophilic monomer, so that the product becomes an insoluble crosslinked polymer. According to the present invention, the crosslinking agent is selected from the group consisting of ethylene glycol di(meth)acrylate (EGDMA), triethylene glycol di(meth)acrylate (TEGDMA), tri(ethylene glycol) divinyl ether (TEGDVE), tetramethylene glycol di(meth)acrylate (TMGDMA) and triallyl isocyanurate (TIC). The content of the crosslinking agent is in an amount from 0.1% to 2% by weight of the high oxygen permeability silicone hydrogel composition.

The initiator is a compound used to induce the curing (crosslinking) reaction between the first silicone polymer, the second silicone polymer, the hydrophilic monomer and the crosslinking agent. According to the present invention, the curing reaction can be a thermal curing reaction or a photo-curing reaction. Therefore, the initiator may be a thermal initiator or a photoinitiator. The photoinitiator is selected from the group consisting of Darocur 1173, Irgacure 184, Irgacure TPO, Irgacure 1700, Irgacure 1800, Irgacure 1850 and Irgacure 819. These are all products of BASF, Germany. The thermal initiator is selected from the group consisting of 2,2'-azobis(2-methylpropionitrile) (AIBN) and 1,1'-azobis(cyanocyclohexane) (ACHN). Whether it is the thermal initiator or the photoinitiator, its content is in an amount from 0.5% to 2% by weight of the high oxygen permeability silicone hydrogel composition.

Due to the cross-linking between the first silicone polymer, the second silicone polymer and the hydrophilic monomer, a certain amount of solvent is required to maintain the fluidity. According to the present invention, the solvent is selected from the group consisting of n-butanol, t-butanol, n-pentyl alcohol, t-amyl alcohol, n-hexanol, n-octanol, n-nonanol and n-decanol. The content of the solvent is in an amount from 5%-20% by weight of the high oxygen permeability silicone hydrogel composition.

Based on the high oxygen permeability silicone hydrogel composition disclosed above, the present invention also discloses several methods for making contact lenses.

Please see FIG. 1. It is a flow chart of a manufacturing method of contact lens using thermal initiator. The manufacturing method of contact lens has following steps. A first step is evenly mixing the high oxygen permeability silicone hydrogel composition (the aforementioned) and pouring the composition in a mold (S01). Since it is used for thermal curing reaction, the mold is not limited to using a steel mold or a plastic mold, nor does it limit the mold itself to be transparent or non-transparent, as long as the mold can effectively conduct heat to the ingredients of the internal high oxygen permeability silicone hydrogel composition. A second step is continuously heating the high oxygen permeability silicone hydrogel composition to cure according to following stages to form a semifinished product: a first stage: heated at 40±2° C. for 30 minutes; a second stage: heated at 60±2° C. for 30 minutes; and a third stage: heated at 80±2° C. for 30 minutes (S02). This step is to heat the high oxygen permeability silicone hydrogel composition through the mold in stages, allowing the thermal initiator to complete the thermal curing reaction. The semifinished product obtained in this step is the prototype of the contact lens, which contains some of the high oxygen permeability silicone hydrogel composition that have not completed the curing reaction. Extraction is required to ensure the usability of the formed contact lens. A third step is washing the semifinished product by an aqueous alcohol solution to extract non-cured portion from the semifinished product and then form a contact lens (S03). According to the present invention, the aqueous alcohol solution may be an aqueous ethanol solution or an aqueous isopropyl alcohol solution. The aqueous alcohol solution can flow through the semifinished product, so the uncured first silicone polymer, second silicone polymer, hydrophilic monomer, crosslinking agent, initiator and solvent can be extracted. The extracted semifinished product is the contact lens that can be used. After this, the manufacturing method of contact lens may further include several packaging steps, for example, putting the contact lens into a packaging container containing a buffer solution (physiological saline), sealing the packaging container, sterilizing the packaging container (by moist heat sterilization), etc. These packaging steps can refer to the ISO standard process, which will not be repeated here.

Please see FIG. 2. It is a flow chart of a manufacturing method of contact lens using photoinitiator. The manufacturing method of contact lens has following steps. A first step is evenly mixing the high oxygen permeability silicone hydrogel composition (the aforementioned) and pouring the composition in a transparent mold (S11). Since the light curing reaction needs to receive ultraviolet light from the outside, therefore, the material of the mold must be light-transmitting, so a transparent plastic mold should be used. The material of transparent plastic mold can be polypropylene, polyethylene, nylon, polyoxymethylene, polyethylene terephthalate, cycloolefin copolymer, polystyrene, polyvinyl chloride, styrene, etc. Then, a second step is irradiating the transparent mold with UV light for 15 to 30 minutes under 25±2° C. to cure the high oxygen permeability silicone hydrogel composition to form a semifinished product (S12). This step is carried out at room temperature under normal atmospheric pressure. The UV irradiation time can be adjusted according to the amount of the photoinitiator and the characteristics of the mold itself, until the semifinished product reaches the acceptable standard. The characteristics of the semifinished product are the same as those described above and will not be repeated here. A third step is washing the semifinished product by an aqueous alcohol solution to extract non-cured portion from the semifinished product and then form a contact lens (S13). Similarly, the aqueous alcohol solution may be an aqueous ethanol solution or an aqueous isopropyl alcohol solution. The aqueous alcohol solution can flow through the semifinished product, extracting the uncured high oxygen permeability silicone hydrogel composition to form the contact lens. For the contact lens using the photoinitiator, the above packaging steps can also be further performed.

According to the present invention, in order to increase the functionality, the contact lens can also add other ingredients besides the aforementioned high oxygen permeability silicone hydrogel composition. Commonly added ingredients are UV absorbing monomer (used with thermal initiator) to reduce external UV rays entering the eye; reactive dyes, used to change the apparent color of the contact lens; and humectants, used to increase the lubricity between the contact lens and the cornea. Furthermore, in addition to the aforementioned high oxygen permeability silicone hydrogel composition, the contact lens can use a third silicone polymer to adjust the physical properties of the contact lens, such as water content and tensile modulus. The mixing ratio of the total amount of the aforementioned added ingredients and the high oxygen permeability silicone hydrogel composition, in terms of parts by weight, can be below 0.25:1.

The following embodiments illustrate the determination of the upper limit of a specific ingredient, and the properties of the contact lens made according to the aforementioned method under different ingredient ratios of the high oxygen permeability silicone hydrogel composition.

Please refer to Table 1 below. A first embodiment group is used to describe the compatibility between the silicone polymer and the hydrophilic monomer, and the influence of the content of the hydrophilic monomer on the transmittance of the contact lens. Table 1 shows the results of compatibility analysis, each of which is observed by mixing the silicone polymers and the hydrophilic monomer (this test is carried out with HEMA monomer), and the above manufacturing method of contact lens is not applied to make a complete contact lens. The first silicone polymer and the second silicone polymer are mixed with the hydrophilic monomer in proportion, and the transparent degree of the solution is confirmed relative to the control group. After the compatibility is confirmed, it is convenient to carry out formula adjustment and physical property tests of the contact lens. Compatibility test results show that the compatibility between the first silicone polymer and the second silicone polymer is transparent and clear, indicating that the first silicone polymer and the second silicone polymer provided by the present invention have good compatibility properties. When adding different proportions of HEMA monomers, it is shown by embodiment A2-A4. When the HEMA content accounts for 20-40% of the total, it still maintains compatibility with the silicone polymers. When the HEMA content reaches 50%, the solution is turbid, indicating that the silicone polymers and HEMA are in a heterogeneous state. According to the above test results, when the formulation experiments of the high oxygen permeability silicone hydrogel composition are carried out later, the upper limit of the hydrophilic monomer can be set according to the test results, so as to adjust the content of the hydrophilic monomer.

TABLE 1

| embodiment | silicone polymer/hydrophilic monomer ratio | test results |
|---|---|---|
| A1 (control group) | first silicone polymer 50% + second silicone polymer 50% | transparent clear |
| A2 | first silicone polymer 40% + second silicone polymer 40% + HEMA 20% | transparent clear |
| A3 | first silicone polymer 35% + second silicone polymer 35% + HEMA 30% | transparent clear |
| A4 | first silicone polymer 30% + second silicone polymer 30% + HEMA 40% | transparent clear |
| A5 | first silicone polymer 25% + second silicone polymer 25% + HEMA 50% | turbid |

Please refer to Table 2 below. A second embodiment group is used to describe the properties of the contact lens prepared by the method described above using the photoinitiator at different ingredient ratios of the high oxygen permeability silicone hydrogel composition. The ingredients of the high oxygen permeability silicone hydrogel composition used in embodiment B1~B5 are the first silicone polymer, the second silicone polymer, HEMA (hydrophilic monomer), EGDMA (crosslinking agent), Irgacure 819 (initiator) and n-hexanol (solvent), with different weight percentages, respectively. The experimental results, the water content (%), tensile modulus (MPa) and oxygen permeability (oxygen permeability, barrer) of the contact lens are shown in Table 2. The change of water content is between 26.6% and 38.4%, the change of tensile modulus is between 0.8 and 1.5 MPa, and the change of oxygen permeability is between 83 and 105 barrer. These physical properties all meet the market demand of contact lens.

TABLE 2

| ingredient | embodiment/ingredient weight percentage | | | | |
|---|---|---|---|---|---|
| | B1 | B2 | B3 | B4 | B5 |
| first silicone polymer | 15 | 15 | 20 | 10 | 5 |
| second silicone polymer | 30 | 35 | 30 | 30 | 40 |
| hydrophilic monomer: HEMA | 35 | 30 | 30 | 40 | 35 |
| crosslinking agent: EGDMA | 0.8 | 0.8 | 0.8 | 0.8 | 0.8 |
| photoinitiator: Irgacure 819 | 1 | 1 | 1 | 1 | 1 |
| solvent: n-hexanol | 18.2 | 18.2 | 18.2 | 18.2 | 18.2 |
| experimental results | | | | | |
| water content (%) | 30.2 | 28.4 | 26.6 | 33.5 | 38.4 |
| tensile modulus (Mpa) | 1.1 | 1.3 | 1.5 | 0.9 | 0.8 |
| oxygen permeability (barrer) | 90 | 98 | 105 | 85 | 83 |

Please refer to Table 3 below. A third embodiment group is used to describe the properties of the contact lens prepared by the method described above using the photoinitiator with various hydrophilic monomers at different ingredient ratios of the high oxygen permeability silicone hydrogel composition. According to the present invention, more than one kind of hydrophilic monomer can be used at a time. Therefore, different from the previous embodiment group, in addition to HEMA, DMA and NVP are added as the hydrophilic monomer to use in embodiment C1~C5. The weight percentage of each ingredient is listed in Table 3. Analyzing the experimental results, in embodiment C1~C5, the water content of the contact lens varies from 33.5% to 43.6%, the tensile modulus varies from 0.6 to 1.2 MPa, and the oxygen permeability varies from 87 to 115 barrer. These physical properties meet the market demand of contact lens. In addition, comparing the overall performance of the third and second embodiment groups, the former has higher water content and oxygen permeability, and lower tensile modulus (softer).

TABLE 3

| ingredient | embodiment/ingredient weight percentage | | | | |
|---|---|---|---|---|---|
| | C1 | C2 | C3 | C4 | C5 |
| first silicone polymer | 15 | 15 | 20 | 10 | 5 |
| second silicone polymer | 30 | 35 | 30 | 30 | 40 |
| hydrophilic monomer: HEMA | 15 | 10 | 5 | 5 | 5 |
| hydrophilic monomer: DMA | 10 | 10 | 15 | 20 | 20 |
| hydrophilic monomer: NVP | 10 | 10 | 15 | 15 | 10 |
| crosslinking agent: EGDMA | 0.8 | 0.8 | 0.8 | 0.8 | 0.8 |
| photoinitiator: Irgacure 819 | 1 | 1 | 1 | 1 | 1 |
| solvent: n-hexanol | 18.2 | 18.2 | 18.2 | 18.2 | 18.2 |
| experimental results | | | | | |
| water content (%) | 36.1 | 35.3 | 33.5 | 41.7 | 43.6 |
| tensile modulus (Mpa) | 0.9 | 1.0 | 1.2 | 0.7 | 0.6 |
| oxygen permeability (barrer) | 93 | 102 | 115 | 88 | 87 |

Please refer to Table 4 below. A fourth embodiment group is used to describe the properties of the contact lens prepared by the method described above using the photoinitiator with various hydrophilic monomers and an additional third silicone polymer at different ingredient ratios of the high oxygen permeability silicone hydrogel composition. According to the present invention, the high oxygen permeability silicone hydrogel composition can also be used with an additional silicone polymer to make contact lens. Different from the previous embodiment group, embodiments D1~D5 additionally use a third silicone polymer. The third silicone polymer can not only be used to adjust the physical properties of the contact lens, but also has better design flexibility for formulation regulation due to its compatibility with the main silicone polymers. In the present embodiment group, the third silicone polymer is (3-methacryloxy-2-hydroxypropoxy)propylbis(trimethylsiloxy) methylsilane (SiGMA). In practice, the third silicone polymer may also be 3-vinyl carbamatepropyl tris(trimethylsiloxy)silane (TRISVC) or monofunctional polydimethylsiloxane (mPDMS) with an average molecular weight of less than 2000 and polymers composed of combinations thereof. The third silicone polymer can be 5% to 20% by weight of the high oxygen permeability silicone hydrogel composition. The weight percentage of each ingredient is listed in Table 4. Analyzing the experimental results, in embodiment D1~D5, the water content of the contact lens varies from 35.5% to 43.1%, the tensile modulus varies from 0.6 to 1.1 MPa, and the oxygen permeability varies from 84 to 110 barrer. These physical properties also meet the market demand of contact lens.

TABLE 4

| ingredient | embodiment/ingredient weight percentage | | | | |
|---|---|---|---|---|---|
| | D1 | D2 | D3 | D4 | D5 |
| first silicone polymer | 10 | 10 | 10 | 5 | 5 |
| second silicone polymer | 30 | 35 | 30 | 30 | 30 |
| third silicone polymer | 5 | 5 | 10 | 5 | 10 |
| hydrophilic monomer: HEMA | 15 | 10 | 5 | 5 | 5 |
| hydrophilic monomer: DMA | 10 | 10 | 15 | 20 | 20 |
| hydrophilic monomer: NVP | 10 | 10 | 15 | 15 | 10 |
| crosslinking agent: EGDMA | 0.8 | 0.8 | 0.8 | 0.8 | 0.8 |
| photoinitiator: Irgacure 819 | 1 | 1 | 1 | 1 | 1 |
| solvent: n-hexanol | 18.2 | 18.2 | 18.2 | 18.2 | 18.2 |
| experimental results | | | | | |
| water content (%) | 38.3 | 36.6 | 35.5 | 42.3 | 43.1 |
| tensile modulus (Mpa) | 0.8 | 0.9 | 1.1 | 0.6 | 0.6 |
| oxygen permeability (barrer) | 90 | 99 | 110 | 84 | 86 |

What is claimed is:

1. A high oxygen permeability silicone hydrogel composition, comprising:
a first silicone polymer, in an amount from 5% to 20% by weight of the composition, having a structural formula (I) below:

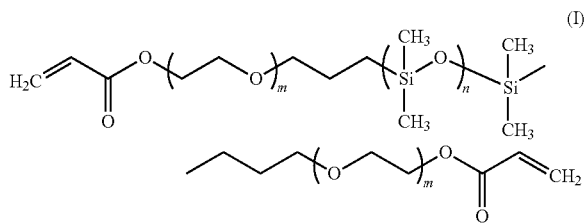

wherein m is an integer between 16 and 20 and n is an integer between 40 and 80;
a second silicone polymer, in an amount from 30% to 60% by weight of the composition, having a structural formula (II) below:

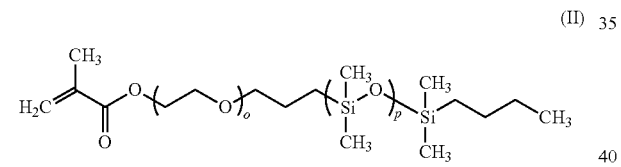

wherein o is an integer between 1 and 10 and p is an integer between 11 and 15;
at least one hydrophilic monomer, in an amount from 20% to 50% by weight of the composition;
a crosslinking agent, in an amount from 0.1% to 2% by weight of the composition;
an initiator, in an amount from 0.5% to 2% by weight of the composition; and
a solvent, in an amount from 5% to 20% by weight of the composition.

2. The high oxygen permeability silicone hydrogel composition according to claim 1, wherein the hydrophilic monomer is selected from the group consisting of 2-hydroxyethyl methacrylate (HEMA), glycerol methacrylate (GMA), acrylic acid (AA), methacrylic acid (MAA), N,N-dimethylacrylamide (DMA), N-vinylpyrrolidone (NVP), N-vinyl-N-methyl acetamide (VMA), 2-methacryloyloxyethyl phosphorylcholine (MPC) and mixtures or derivatives thereof.

3. The high oxygen permeability silicone hydrogel composition according to claim 1, wherein the crosslinking agent is selected from the group consisting of ethylene glycol di(meth)acrylate (EGDMA), triethylene glycol di(meth)acrylate (TEGDMA), tri(ethylene glycol) divinyl ether (TEGDVE), tetramethylene glycol di(meth)acrylate (TMGDMA) and triallyl isocyanurate (TIC).

4. The high oxygen permeability silicone hydrogel composition according to claim 1, wherein the solvent is selected from the group consisting of n-butanol, t-butanol, n-pentyl alcohol, t-amyl alcohol, n-hexanol, n-octanol, n-nonanol and n-decanol.

5. The high oxygen permeability silicone hydrogel composition according to any one of claims 1 to 4, wherein the initiator is a thermal initiator and selected from the group consisting of 2,2'-azobis(2-methylpropionitrile) (AIBN) and 1,1'-azobis(cyanocyclohexane) (ACHN).

6. A manufacturing method of contact lens, comprising steps of:
a) evenly mixing the high oxygen permeability silicone hydrogel composition according to claim 5 and pouring the composition in a mold;
b) continuously heating the high oxygen permeability silicone hydrogel composition to cure according to following stages to form a semifinished product:
a first stage: heated at 40±2° C. for 30 minutes;
a second stage: heated at 60±2° C. for 30 minutes; and
a third stage: heated at 80±2° C. for 30 minutes; and
c) washing the semifinished product by an aqueous alcohol solution to extract non-cured portion from the semifinished product and then form a contact lens.

7. The manufacturing method of contact lens according to claim 6, wherein the aqueous alcohol solution is aqueous ethanol solution or aqueous isopropyl alcohol solution.

8. A contact lens made from the high oxygen permeability silicone hydrogel composition according to any one of claims 1 to 4.

* * * * *